J. HINDMAN.
Hemp Brake.
No. 22,725.
Patented Jan'y 25, 1859.
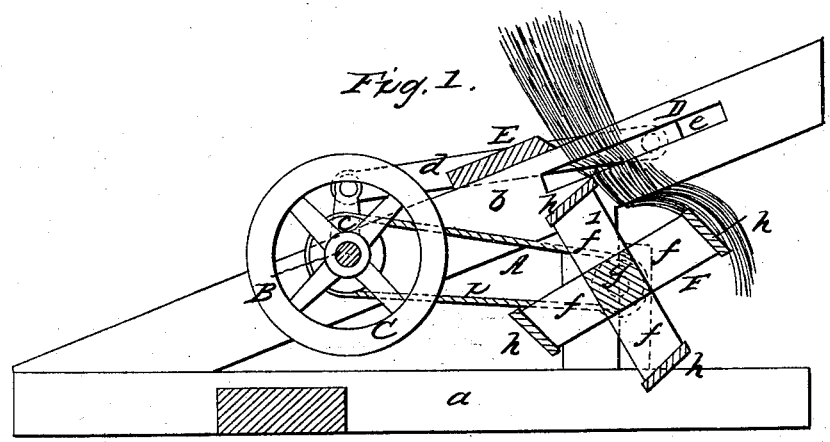
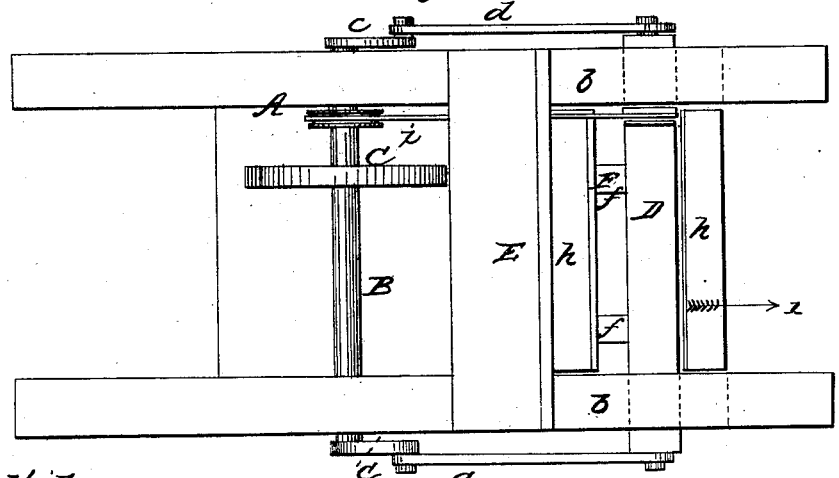
Witnesses:
J. W. Spencer
W. H. Smith
Inventor:
John Hindman

UNITED STATES PATENT OFFICE.

JNO. HINDMAN, OF HAYNESVILLE, MISSOURI.

IMPROVEMENT IN HEMP-BRAKES.

Specification forming part of Letters Patent No. 22,725, dated January 25, 1859.

*To all whom it may concern:*

Be it known that I, J. HINDMAN, of Haynesville, in the county of Clinton and State of Missouri, have invented a new and Improved Hemp-Brake; and I do hereby declare that the following is a full, clear, and exact description of the same, reference being had to the annexed drawings, making a part of this specification, in which—

Figure 1 is a side sectional elevation of my invention. Fig. 2 is a plan or top view of the same.

Similar letters of reference indicate corresponding parts in the several figures.

This invention consists in the employment or use of a reciprocating beater, stationary bar, and a reel, placed within a suitable frame and arranged in such relation with each other that the hemp, as it is fed to the machine, is properly bruised or broken and the woody portion separated from the fiber, the machine performing its work in a very expeditious and perfect manner.

To enable those skilled in the art to fully understand and construct my invention, I will proceed to describe it.

A represents a framing, the base $a$ of which is horizontal, and its upper part, $b$, inclined at an angle of about thirty degrees, as shown clearly in Fig. 1.

On the upper part of the framing A a transverse shaft, B, is placed. This shaft has a fly-wheel, C, placed on it, and a crank, $c$, is placed on each end of said shaft, the cranks being at the outer sides of the framing.

To each crank $c$ one end of a connecting-rod, $d$, is attached, and the opposite ends of these rods are affixed to the ends of a metal bar, D, which works in slots $e$, made longitudinally in the upper and inclined side pieces, $b$, of the framing. On the upper part of the framing a wooden bar, E, is secured transversely, said bar being parallel with the bar D.

F is a reel, which is placed in the framing A just below the bar D. This reel is formed by having radial arms $f$ attached to a shaft, $g$, the ends of the arms having blades or bars $h$ attached, said blades or bars being parallel with the shaft $g$. The blades or bars $h$ are formed of flat wooden strips, and their front edges are slightly elevated, as shown clearly in Fig. 1. The reel F is driven in the direction indicated by the arrow 1 by a band, $i$, from the shaft B.

The operation will be readily understood, and is as follows: Power is applied to the shaft B in any proper way, and a reciprocating motion is given the bar or beater D through the medium of the cranks $c$ and connecting-rods $d$, and the reel F is rotated by the band $i$. The operator feeds the hemp (shown in red) down between the bar E and the beater D, and the latter breaks or bruises the woody portion between the stationary bar E and the blades $h$ of the reel. The blades $h$ of the reel perform a double function. They not only serve as bearings for the beater D to force the hemp against and at the same time shove the hemp outward for a succeeding stroke of the beater, but they also, by their rotation, perform the office of "scutchers," and separate the broken woody matter from the fiber, the blades $h$ acting nearly in a longitudinal direction on the hemp. The hemp, therefore, is properly dressed, and the work is done very expeditiously.

I am aware that reciprocating beaters have long been used for breaking hemp, and I therefore do not claim, broadly, such device; but having thus described my invention,

What I claim as new, and desire to secure by Letters Patent, is—

The reciprocating beater D, stationary bar E, and reel F, combined and arranged to operate substantially as and for the purpose set forth.

JOHN HINDMAN.

Witnesses:
JAS. P. GEE,
TILVERTON GREEN.